July 3, 1951  C. H. GEMBERLING ET AL  2,558,948
SUBSOIL PLOW
Filed March 7, 1945  3 Sheets-Sheet 1
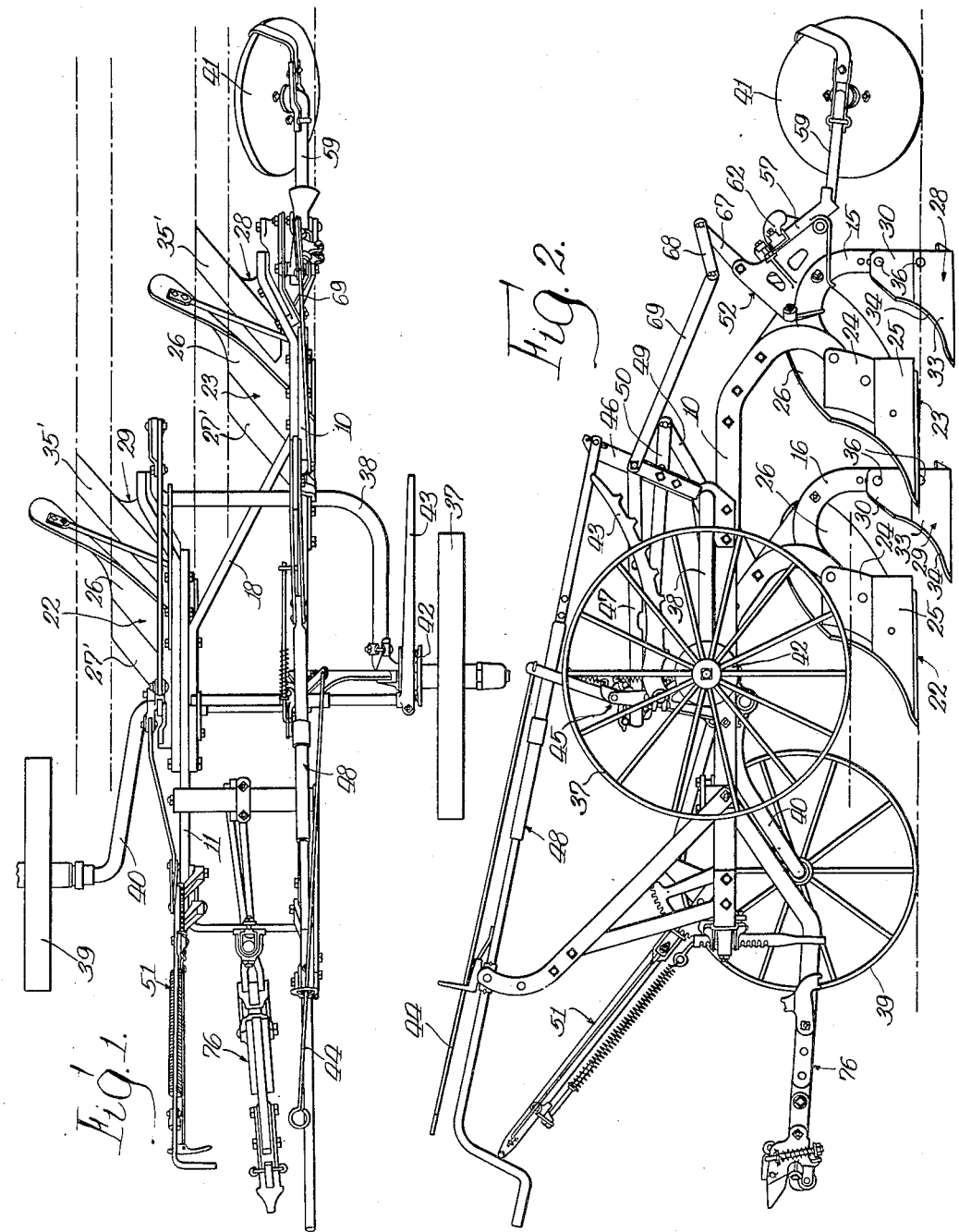
INVENTORS.
Cameron H. Gemberling
Rudolph J. Altgelt
BY John P. Smith
Atty.

July 3, 1951  C. H. GEMBERLING ET AL  2,558,948
SUBSOIL PLOW
Filed March 7, 1945  3 Sheets-Sheet 2

INVENTORS.
Cameron H. Gemberling,
BY Rudolph J. Attgett,
John P. Smith
Atty.

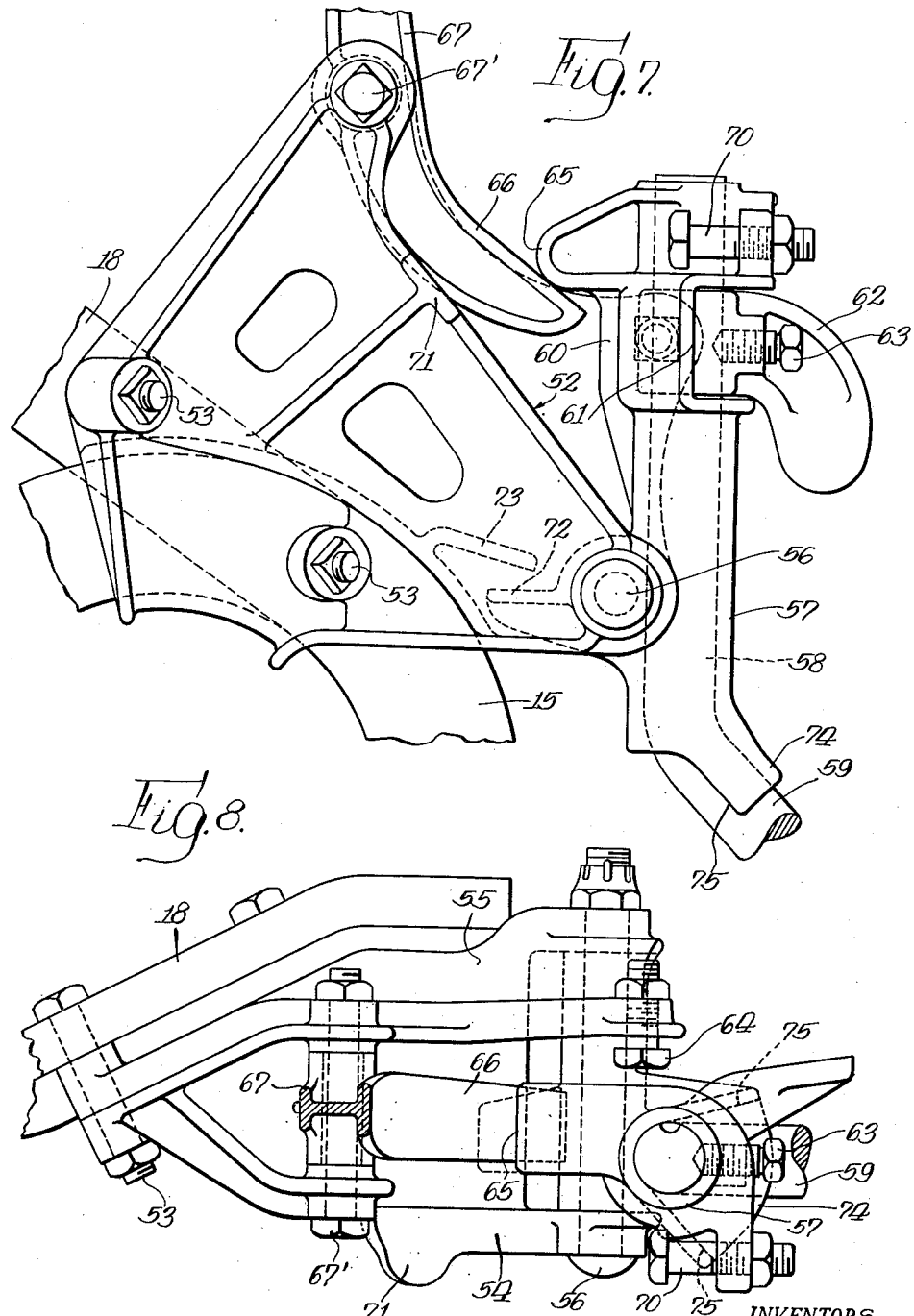

Patented July 3, 1951

2,558,948

UNITED STATES PATENT OFFICE 2,558,948

SUBSOIL PLOW

Cameron H. Gemberling and Rudolph J. Altgelt, South Bend, Ind., assignors to The Oliver Corporation, a corporation of Delaware Application March 7, 1945, Serial No. 581,368

6 Claims. (Cl. 97—78)

The present invention relates generally to plows, but more particularly to a novel and improved type of subsoil plow which is simple in construction and light of draft.

The use of deep tillage or subsoil plows with earth working members operating behind and at deeper penetration of the ground than the regular plow bases have been made for many years, and the advantages derived from this type of plowing in the preparation of the soil for a superior soil preparation has long been fully recognized and demonstrated by leading agronomists. This type of soil preparation has not only shown the advantages for the development and growth of vegetable and garden crops, but also for corn, wheat, clover and other field crops. Subsoil attachments for mouldboard plows have been profitably used in the preparation of seed beds or vegetable gardens, but they have only been used to a limited extent in the preparation of seed beds for corn, wheat, clover and other field crops for the reason that the available mouldboard plows with subsoil attachments are too heavy in draft to make their use for common field plowing satisfactory or popular.

It is therefore one of the primary objects of the present invention to provide a novel and improved construction of subsoil plow which will not only overcome the disadvantages hereinabove pointed out, but will also reduce the draw bar pull to such an extent that the draft on the subsoil plow will be less than that of the conventional plow plowing at the same depth.

A further object of the invention is to provide a novel and improved type of power lift subsoil plow of a two base type which will plow deeper than is possible with the conventional mouldboard plow with substantially the same drawbar pull and which, at the same time, will completely break up or disrupt the plow pan without turning the same to the surface of the plowed field.

A further object of the invention is to provide a novel and improved type of subsoil plow in which a pair of spaced and staggered bases are provided with individual or supplementary subsoil bases so arranged that the shares thereof extend substantially across the intervening space to insure the complete disruption or breaking up of the plow pan so that no tap roots of alfalfa or weeds can escape being cut off.

A further object of the invention is to provide a novel and improved subsoil plow of the mouldboard type in which the shares of the main or upper bases are interchangeable with the shares of the lower subsoil bases.

A still further object of the invention is to provide a novel and improved power lift subsoil plow in which the landside of each of the subsoil bases is offset away from the landside of its complementary upper or main base so that the projecting share on each of the subsoil bases will project laterally beyond to a point substantially in alignment of the path of the landside of the lateral adjacent forward subsoil base to effect a complete disruption or breaking up of the plow pan between adjacent and intervening furrows.

A yet further object of the invention is to provide a novel and improved subsoil plow and plow frame structure in which the rear furrow wheel is attached to one of the beams of the subsoil or lower rear bases and held in locked position against the bottom of the left furrow bank made by the upper or main plow base while plowing.

These and other objects are accomplished by providing a construction and an arrangement of the various parts in the manner hereinafter described and particularly pointed out in the appended claims.

Referring to the drawings:

Fig. 1 is a top plan view of our improved subsoil plow;

Fig. 2 is a side elevational view of the same;

Fig. 7 is an enlarged detailed view in elevation showing the construction of the bracket for the rear furrow wheel; and Fig. 8 is a top plan view showing the construction of the bracket shown in Fig. 7.

Figure 3:
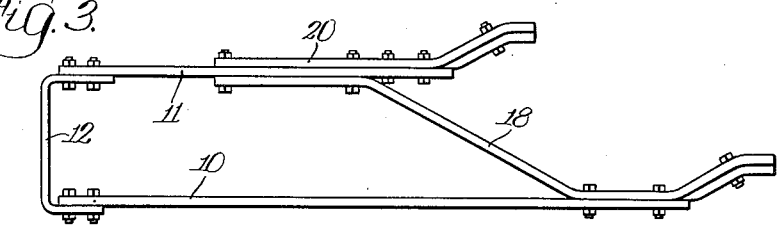
Fig. 3 is a detailed top plan view of the frame or beam construction of the plow.
Figure 4:
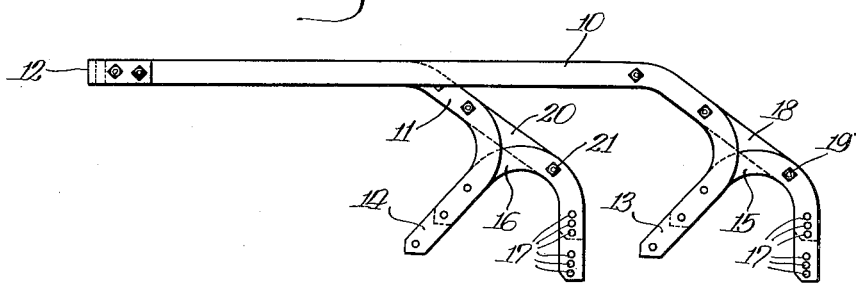
Fig. 4 is a side elevational view of the construction shown in Fig. 3.
Figure 5:
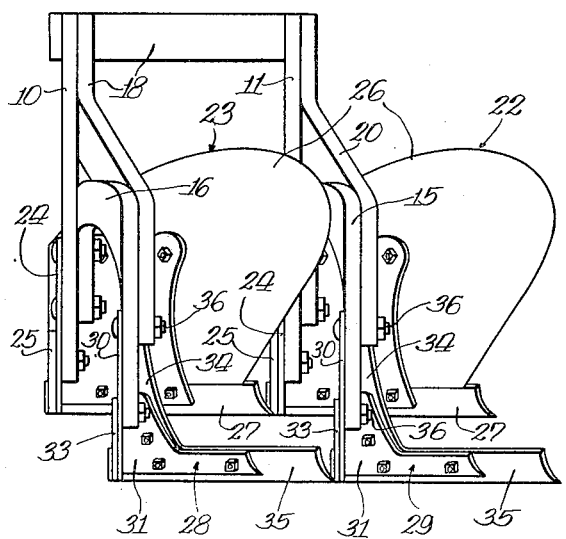
Fig. 5 is an enlarged rear elevational view of the plow construction showing all the bases equipped with longer shares than disclosed in Figs. 1 and 2 of the drawings.

The primary object of the present invention as hereinabove pointed out, is to provide a construction of subsoil plow in which substantially the same drawbar pull will secure relatively deeper plowing than is possible to accomplish with a conventional mouldboard plow and in addition thereto, the new plow will effect a complete breaking up of the plow pan without turning it to the surface of the plowed field. The preferred embodiment of our invention which accomplishes these objects includes a main frame or beam construction comprising two horizontally spaced longitudinally extending main plow beam members 10 and 11 respectively which have their forward ends secured together by transverse U-shaped frame member 12. The beam 10 is relatively longer than the beam 11 so as to stagger the upper or main plow bases with respect to one another. The rear ends of each of these beams 10 and 11 are curved downwardly terminating in a forwardly extending portion as shown at 13 and 14 respectively. Secured to the downwardly and forwardly extending portions 13 and 14 of the respective beams 10 and 11 are substantially inverted U-shaped lower subsoil beams or brackets 15 and 16. The rear portions of these beams or brackets 15 and 16 extend substantially vertically and are provided with a series of apertures as shown at 17 to permit the vertical adjustment of the subsoil or lower bases with respect to the main plow bases. Extending between the main beams 10 and 11 is a diagonally extending brace member 18, the rear end of which is inclined downwardly and terminates in a curvature complementary to the bracket 15 to which it is attached by means of a bolt 19. Attached to the outside of the main beam 11 is a reinforcing member 20 which has its rear end inclined downwardly and conforming to the curvature of the bracket or beam 16 to which it is attached by means of a bolt 21. From the above construction it will be noted that U-shaped subsoil beams 15 and 16 also reinforce and strengthen the main plow base beams. Attached to the lower ends of each of the beams 10 and 11 are upper or main plow bases generally indicated by the reference characters 22 and 23. The plow base 22 being located forwardly and laterally with respect to the plow base 23. Each of these plow bases, as shown in Fig. 5 of the drawings, comprises the usual standard 24, landside member 25, relatively large mouldboard 26 and a relatively long removable share 27. Supported on each of the beams or brackets 15 and 16 and vertically adjustable with respect thereto are lower or subsoil plow bases generally indicated by the reference characters 28 and 29 respectively. Each of these lower or subsoil plow bases 28 and 29 comprises a vertical standard 30 to which is welded a laterally projecting curved base plate 31. The outer end of the plate 31 is braced to the standard 30 by a round brace 32 which has its opposite ends welded to the respective members 30 and 31 as clearly shown in Fig. 6 of the drawings. Bolted to each of the standards 30 are landside members 33. Secured to each of the base plates 31 of each of the subsoil plows 28 and 29 are relatively narrow mouldboards 34 which merely serve the purpose of keeping the soil from sticking to the standards 30. Secured to each of the plates 31 of each of the subsoil bases 28 and 29 are laterally projecting and relatively long shares 35 which are interchangeable with and in this instance, identically like the shares 27 of the upper or main plow bases 22 and 23. In Figs. 1 and 2 of the drawings, relatively shorter shares designated by the reference characters 27' and 35' are shown which may be used in certain soil conditions. These subsoil bases 28 and 29 may be vertically adjusted with respect to their supporting beams or brackets 15 and 16 by positioning and securing bolts 36 in a variety of vertically positioned apertures 17 of these brackets for regulating the depth penetration of these subsoil plows with respect to the upper or main plow bases.

Figure 6:
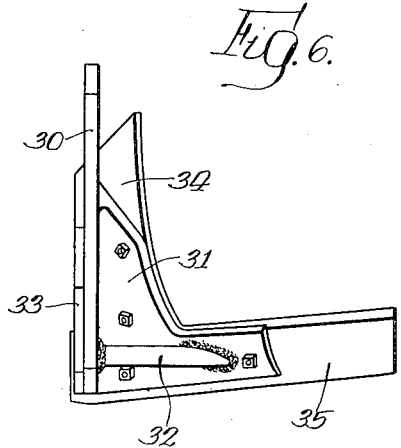
Fig. 6 is an enlarged detailed and rear elevational view of one of the subsoil bases.

It will be observed by examining Fig. 1 of the drawings, that we have shown our improved subsoil plow with relatively shorter shares designated by the reference characters 27' and 35' on each of the upper and lower subsoil plows respectively than is shown in Figs. 5 and 6 of the drawings.

The longer shares in these latter figures of the drawings are designated by the reference characters 27 and 35. With the longer shares employed as shown in Figs. 5 and 6 of the drawings, on both the upper and lower bases, it will be obvious that the soil is cut twice, once by the upper base and again by the lower base, so that no tap roots of alfalfa or of weeds can escape from being cut completely off both in the normal plowed surface and the plow pan of the soil. With the longer shares employed as shown in Figs. 5 and 6 of the drawings, on all four bases the ground is cut or sliced twice completely across the plowed field to thereby reduce the thickness of the clods in comparison with those turned over by conventional mouldboard plow plowing. This arrangement has special advantages in plowing fields which are badly infested with quack grass or other weeds having an abundance of roots. In the employment of relatively shorter shares as shown at 27' and 35' in Figs. 1 and 2 of the drawings for all the bases, the intervening land space between the two upper plow bases is undercut by the rear share 35' of the subsoil plow 28 so that all the soil is cut through at least once to insure the cutting of tap roots of alfalfa or weeds in the plowing operation. In this connection, of course, it is also possible to employ shares of even shorter lengths or even different lengths for the upper and lower bases than those shown in Figs. 1 and 2 of the drawings so as to take care of certain soil conditions such as may be required in stony sections of the country. With the employment of relatively shorter shares in gravel or stony soil, the accidental raising or rolling of the plow out of its ground position is eliminated or reduced to a minimum. Under such conditions when shorter shares are used, the uncut portion of the soil between the adjacent plow bases will readily break through to satisfactorily accomplish the proper plowing function.

From the above description it will be seen that by providing the subsoil bases with relatively narrow mouldboards and offsetting the subsoil bases laterally away from the landside of the upper bases, it is possible with the same drawbar pull to plow deeper than with the conventional mouldboard plow and at the same time insure a complete breakage of the plow pan without turning it to the surface of the plowed field. This is accomplished by using conventional or regular main bases with complementary and relatively smaller subsoil bases together with interchangeable shares for all the plow bases.

The power lift mechanism and the controls therefor of our improved subsoil plow is substantially like that disclosed in the H. E. Altgelt Patent No. 2,359,600, granted October 3, 1944, and for that reason this mechanism will only be briefly described, since a detailed description of the same may be had by reference to this patent.

The plow structure is supported on one side by a land wheel 37, which in turn, is journaled on a crank axle 38 pivoted to the main frame members or beams 10 and 11. The other side of the plow structure is supported on a furrow wheel 39 which in turn is journaled on a crank axle 40 pivotally supported to the main frame members 10 and 11. The rear part of the plow is supported on a rear furrow wheel, generally indicated by the reference character 41, the function and operation of which will hereinafter be more fully described. The power to actuate or lift the plow proper off the ground is derived through means of a pinion 42 attached to or carried by the land wheel 37 and is adapted to be engaged by a curved rack 43. The rack 43 is tipped or actuated into engagement by a hand trip 44 extending within easy reach of the operator on the tractor. This hand trip is operatively connected to a locking and tripping mechanism generally indicated by the reference character 45. The details and functions of operation of the trip mechanism may be had by reference to the previously mentioned patent. Secured to the crank axle 38 is an upwardly and rearwardly inclined lever 46. Connected intermediate the ends of the lever 46 is a locking bar 47 which has its forward end operatively connected with the tripping locking mechanism 45. The upper end of the lever 46 is operatively connected to a hand adjusting screw, generally indicated by the reference character 48, by means of which the depth penetration of the plow as a whole may be adjusted from the operator's seat on the tractor. Secured to the furrow side of the crank axle 38 is a second lever 49. Operatively connected to the upper end of the lever 49 is a connection 50, which in turn is connected to an equalizing mechanism and crank connection with the furrow wheel axle 40 in the manner more completely disclosed in the aforementioned patent. Pivotally mounted on the forward end of the plow frame adjacent the operator's seat on the tractor is a hand operating lever and a sector locking mechanism, generally indicated by the reference character 51, which in turn is operatively connected between the two crank axles 38 and 40 for adjusting the furrow wheel 39 with respect to the land wheel 37 for effecting a leveling of the plow frame. The details of this construction may be had by referring to the aforementioned patent.

Another essential feature of the present invention involves the securing of the rear wheel bracket to the offset subsoil beam so that the rear wheel runs in alignment with the landside of the upper or main plow base and against the side wall of the upper furrow in order to counteract the furrow side pressure of the plow. This novel construction also includes means for locking the rear furrow wheel against swiveling movement during the plowing operation and permitting it to swivel when turning at each end of the field or for transportation when the plow frame is in raised position. This arrangement includes a bracket, generally indicated by the reference character 52, which is bolted by means of bolts 53 to the subsoil beam 15 and brace 18 is clearly shown in Figs. 7 and 8 of the drawings. This bracket includes two horizontally spaced apart vertical walls 54 and 55 having bearing supporting portions. Pivotally mounted on a bolt 56 between the vertical walls 54 and 55 is a rear furrow wheel sleeve 57. Journaled in the sleeve 57 for limited oscillatory movement is a vertical shank 58 of a rear wheel axle 59. Journaled on the angularly bent portion of the axle 59 is the rear furrow wheel 41. Located adjacent the upper end of the sleeve 57 is an enlarged arcuate portion 60 which has the rear side thereof opened as shown at 61. Secured to the vertical shank 58 and extending through the opening 61 in the sleeve 57 is a lever member 62 which has a collar at one end embracing the shank and secured thereto by threaded set screw 63. The lever 62 is curved arcuately in a downward direction and is adapted to move into the path of and engage an adjustable bolt 64 carried by the wall 55 of the bracket 52. When the plow frame is in its lower or plowing position as shown in Fig. 2 of the drawings, the lever 62 is adapted to engage the head of the bolt 64 to lock the rear furrow wheel 41 against the swivel movement, or rather lock the same against the landside wall made by the upper or main plow base. Formed adjacent the upper end of the sleeve 57 is a forwardly curved projection 65 which is located in the path of and adapted to be engaged by a curved lower end 66 of a lever 67. The lever 67 is pivotally mounted intermediate its ends on a bolt 67' between the portions 54 and 55 of the bracket 52. The upper end of the lever 67 is connected by means of two links 68 and 69 to an intermediate portion of the lever 46 of the crank wheel axle 38. Secured to one side of the sleeve 57 adjacent the upper end thereof is an adjustable bolt 70 which moves in the path of and is adapted to engage a laterally projecting stop or lug 71 formed on the wall 54 of the bracket 52 for limiting the rearward swinging movement of the furrow wheel 41 with respect to the main frame of the plow. The upward movement of the frame of the plow with respect to the furrow wheel is limited by a stop 72 formed on the sleeve 57. This stop or lug 72 is adapted to move in the path of and engage a stop 73 carried by the bracket 52. The oscillatory movement of the rear axle 59 within the sleeve 57 in the position shown in Figs. 7 and 9 of the drawings is limited by opposite stops 75 formed on a fantail projection 74 carried by the lower end of the sleeve 57.

From the above description it will be readily seen that when the plow frame is in its elevated or raised position, or the position shown in Figs. 7 and 8 of the drawings, which it assumes at the end of the field or when the plow is being transported, the rear wheel 41 is free to caster within the limits of the stops 75 formed on the lower end of the sleeve 57. However, when the plow is lowered to its working position, or the position shown in Figs. 1 and 2 of the drawings, the arcuate lever 62 engages the bolt head 64 to lock the furrow wheel 41 against the wall of the furrow formed by the upper plow base. It will also be noted in this connection that the subsoil beam 15 connects and supports rear furrow wheel bracket in offset relation to the main base beam and also reinforces and strengthens the main beam.

The plow in the present instance is provided with a draft hitch or draft mechanism generally indicated by the reference character 76 of the same general character, construction and function of operation as that disclosed in the aforementioned patent and more details of which can be had by reference to that patent.

By referring to Fig. 1 of the drawings it will be observed that the furrow side edge of the share 27' of the main plow base 22 is spaced a considerable distance inwardly from the line of travel of the inner edge of the furrow wheel 39. This permits the trailing subsoil share 35' of the complementary subsoil base 29 to break up the plow pan and effectively plow up the unplowed soil left between the furrow wheel and the main plow base 22.

Summarizing the advantages and functions of operation of our improved power lift subsoil plow, it will be observed that by having the subsoil bases, as well as the shares thereof, offset in a direction away from the landside of the complementary upper bases so that the shares attached to the subsoil bases completely disrupt or cut the intervening space or soil between the upper bases even when relatively short shares are used, a complete disruption and breaking up of the surface soil and plow pan is assured. This arrangement will obviously cut the soil clear across and between the main or upper plow base furrows so that no tap roots or weeds can escape being cut off in the plow pan and this will be accomplished without turning the plow plan to the surface of the plowed field. It will also be noted that by employing a relatively narrow mouldboard on each of the lower of subsoil plow bases, together with knife-like shares associated therewith, the draft pull required in the present subsoil plow will require less than that of two conventional plow bases plowing of equal depth penetration.

It will be further noted that the inverted U-shaped beams or brackets for the rear or lower subsoil bases serve to reinforce and strengthen the main or upper base beams and one of the subsoil beams serves to support the rear furrow wheel bracket in an offset position to engage the side wall of the furrow made by the complementary upper plow base. The means for locking the rear furrow wheel in plowing position insures the proper alignment of the subsoil bases with respect to the upper bases.

From the above description it will be seen that we have not only provided a simplified construction of power lift two-base plow with supplementary offset subsoil bases in which the plow shares are interchangeable, but also one which reduces the draft thereof to a minimum.

While in the above specification we have described one embodiment which our invention may assume in practice, it will of course be understood that the same is capable of modification and that modification may be made without departing from the spirit and scope of the invention as expressed in the following claims.

What we claim as our invention and desire to secure by Letters Patent is:

1. A wheel supported subsoil plow comprising a frame, a side furrow wheel connected to said frame, two laterally spaced main plow bases carried by said frame, said bases being so spaced laterally to leave an unplowed strip of ground between said bases, a subsoil base carried by said frame rearwardly of said main bases, and a laterally projecting share carried by said subsoil base and extending into the strip of unplowed ground between said main plow bases, the shares of all said bases being set inwardly from the line of travel of said furrow wheel.

2. A wheel supported subsoil plow comprising a frame, a side furrow wheel connected to said frame, a plurality of complementary main plow bases carried by said frame, said bases being arranged in echelon relation with respect to each other and spaced laterally from one another so as to leave an unplowed strip of ground there between, complementary subsoil bases for each of said main bases carried by said frame, said subsoil bases being located rearwardly and laterally in a furrow side direction with respect to each of said complementary main bases so as to plow the unplowed strip of ground between the adjacent main bases, and laterally and rearwardly extending shares carried by all of said bases, none of which extend beyond the line of travel of said furrow wheel.

3. A wheel supported subsoil plow comprising a frame, a furrow wheel for supporting one side of said frame, a plurality of complementary main plow bases carried by said frame, said bases being arranged in echelon relation with respect to each other, said main plow bases being spaced laterally from one another so as to leave an unplowed strip of ground there between, complementary subsoil bases for each of said main bases carried by said frame, said subsoil bases being located rearwardly and laterally in a furrow side direction with respect to each of said complementary main bases so as to plow the unplowed strip of ground between the main plow bases, and shares carried by all of said plow bases and extending laterally therefrom whereby two complete cuts of the soil at different depth penetration are secured in the plowing operation, the share of the forward subsoil base having its outer edge set inwardly with respect to the line of travel of said furrow wheel.

4. A wheel supported subsoil plow comprising a frame, a plurality of complementary main plow bases carried by said frame, said bases being arranged in echelon relation with respect to each other, said main plow bases being spaced laterally from one another so as to leave an unplowed strip of ground there between said main bases including relatively large mouldboards complementary subsoil bases for each of said main bases carried by said frame and including relatively smaller mouldboards, said subsoil bases being located rearwardly and laterally in a furrow side direction with respect to each of said complementary main bases so as to plow the unplowed strip of ground between the main plow bases, and shares carried by all of said plow bases and extending laterally therefrom whereby two complete cuts of the soil across the whole path of the plow are secured.

5. A wheel supported subsoil plow comprising a frame, a plurality of complementary main plow bases carried by said frame, said bases being arranged in echelon relation with respect to each other and laterally spaced with respect to one another so as to leave an unplowed strip of ground there between, said bases including relatively large mouldboards complementary subsoil bases for each of said main bases carried by said frame, said subsoil bases including mouldboards relatively smaller than those of said main bases said subsoil bases being located rearwardly and laterally in a furrow side direction with respect to each of said complementary main bases so as to plow the unplowed strip of ground between said main bases, and shares of equal length carried by all of said bases.

6. A subsoil plow comprising a frame, wheels for supporting said frame, said frame including a plurality of longitudinally extending spaced apart main beams, complementary main plow bases carried by said beams and spaced laterally with respect to one another so as to leave an unplowed strip of ground there between, subsoil beams secured to said main beams, vertically adjustable subsoil bases secured to said last named beams and offset laterally with respect to the landside of the complementary main bases so as to plow the unplowed strip of ground between said main bases, a castering rear furrow wheel attached to one of said subsoil beams and adapted to travel in the path of the landside of one of said main bases, means carried by said main frame for locking said rear furrow wheel against the bank of the furrow made by one of said main plow bases during the plowing operation.

CAMERON H. GEMBERLING.
RUDOLPH J. ALTGELT.

(References on following page)

REFERENCES CITED

The following references are of record in the file of this patent:

UNITED STATES PATENTS

| Number | Name | Date |
|---|---|---|
| 31,955 | Cooper | Apr. 9, 1861 |
| 39,761 | Tallmadge | Sept. 1, 1863 |
| 119,404 | Pitts | Sept. 26, 1871 |
| 157,721 | Munger | Dec. 15, 1874 |
| 628,355 | Reis | July 4, 1899 |
| 655,062 | Daverkosen et al. | July 31, 1900 |
| 748,682 | Allman | Jan. 5, 1904 |
| 953,893 | Bishop | Apr. 5, 1910 |
| 1,032,020 | Mixter | July 9, 1912 |
| 1,145,212 | Plummer | July 6, 1915 |
| 1,396,793 | Traphagen | Nov. 15, 1921 |
| 1,489,467 | Strandlund | Apr. 8, 1924 |
| 1,489,481 | Brown | Apr. 8, 1924 |
| 1,606,132 | Ray | Nov. 9, 1926 |
| 1,815,332 | Scarlett | July 21, 1931 |
| 1,857,859 | Nelessen et al. | May 10, 1932 |
| 1,865,598 | Verity | July 5, 1932 |
| 2,212,136 | Vale | Aug. 20, 1940 |
| 2,234,351 | Perosa | Mar. 11, 1941 |
| 2,283,379 | Lindgren et al. | May 19, 1942 |
| 2,359,600 | Altgelt | Oct. 3, 1944 |